US010722842B2

(12) United States Patent
Larson

(10) Patent No.: US 10,722,842 B2
(45) Date of Patent: Jul. 28, 2020

(54) SYSTEM FOR CARBON ABATEMENT NATURALLY OVER PAVED ENVIRONMENTS

(71) Applicant: Audrey H. Larson, Wallingford, CT (US)

(72) Inventor: Audrey H. Larson, Wallingford, CT (US)

(*) Notice: Subject to any disclaimer, the term of this patent is extended or adjusted under 35 U.S.C. 154(b) by 0 days.

(21) Appl. No.: 15/994,037

(22) Filed: May 31, 2018

(65) Prior Publication Data

US 2019/0060830 A1 Feb. 28, 2019

Related U.S. Application Data

(60) Provisional application No. 62/549,778, filed on Aug. 24, 2017.

(51) Int. Cl.
| | |
|---|---|
| *B01D 53/62* | (2006.01) |
| *B01D 53/85* | (2006.01) |
| *B01D 53/92* | (2006.01) |
| *B01D 53/84* | (2006.01) |
| *A01G 9/033* | (2018.01) |

(52) U.S. Cl.
CPC .............. *B01D 53/62* (2013.01); *A01G 9/033* (2018.02); *B01D 53/84* (2013.01); *B01D 53/85* (2013.01); *B01D 53/92* (2013.01); *B01D 2221/16* (2013.01); *B01D 2251/95* (2013.01); *B01D 2257/504* (2013.01); *B01D 2258/01* (2013.01); *B01D 2258/06* (2013.01); *B01D 2259/802* (2013.01)

(58) Field of Classification Search
CPC ........ B01D 53/62; B01D 53/84; B01D 53/85; B01D 53/92; B01D 2221/16; B01D 2251/95; B01D 2257/504; B01D 2259/802; A01G 9/00; A01G 9/025; A01G 9/033; A01G 9/249; A01G 7/045
USPC ........... 96/121, 150; 95/1, 107, 139; 47/65.5
See application file for complete search history.

(56) References Cited

U.S. PATENT DOCUMENTS

| | | | | |
|---|---|---|---|---|
| 5,315,834 A | * | 5/1994 | Garunts | A61L 9/00 62/78 |
| 5,407,470 A | * | 4/1995 | Jutzi | A01G 9/00 96/121 |
| 5,718,441 A | * | 2/1998 | Kern | A47B 57/14 211/187 |
| 6,006,471 A | * | 12/1999 | Sun | A01G 9/18 47/69 |
| 6,727,091 B2 | * | 4/2004 | Darlington | B01D 53/85 435/299.1 |
| 2014/0041298 A1 | * | 2/2014 | Mack | A01G 9/02 47/66.6 |
| 2015/0150198 A1 | * | 6/2015 | Sinha | A01G 27/00 47/82 |

* cited by examiner

*Primary Examiner* — Frank M Lawrence, Jr.
(74) *Attorney, Agent, or Firm* — Cantor Colburn LLP

(57) ABSTRACT

A carbon abatement system includes at least one carbon abatement panel including a carbon abatement material. The at least one carbon abatement panel is rotatable about an axis to maximize exposure of the carbon abatement material to sunlight.

14 Claims, 7 Drawing Sheets

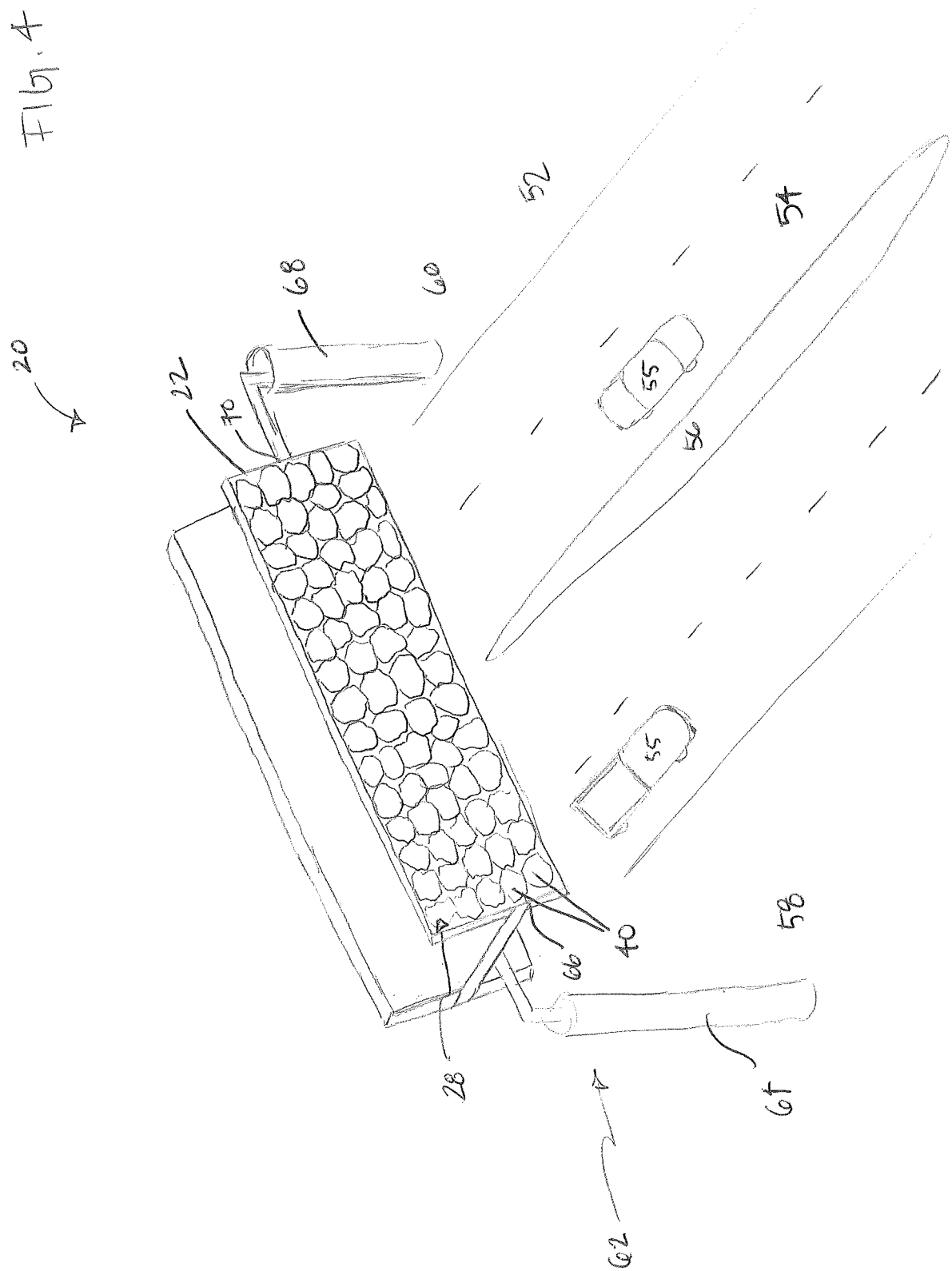

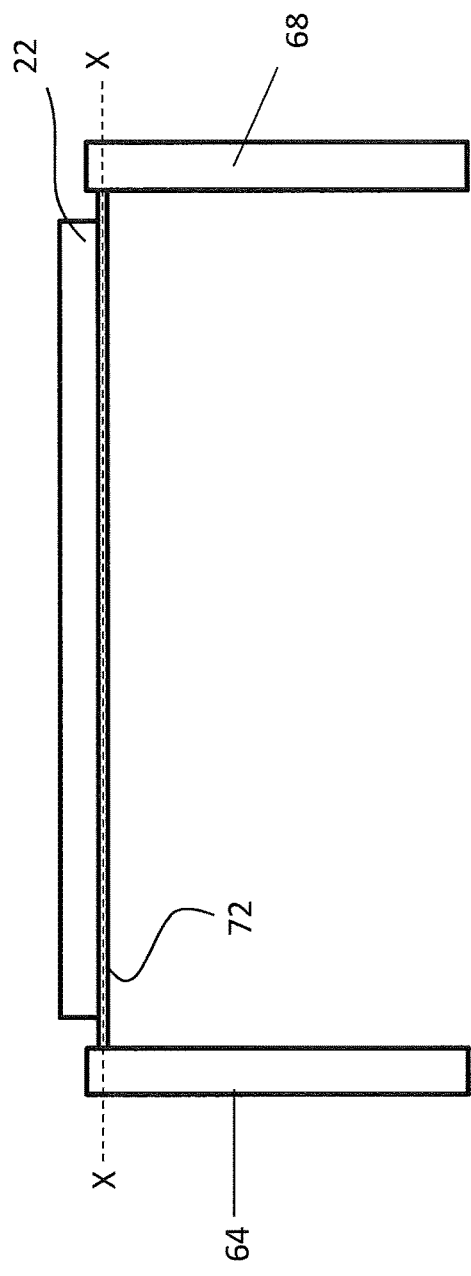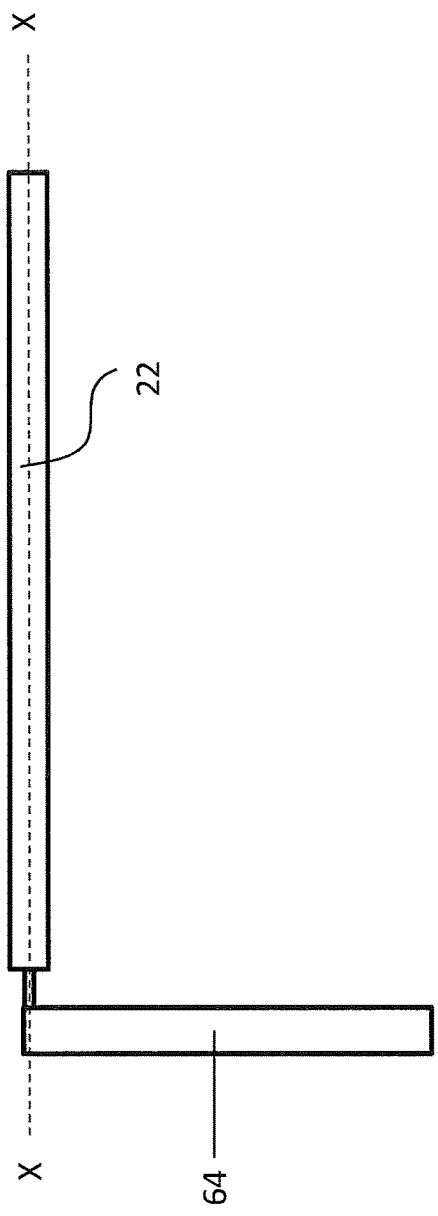
FIG. 5A
FIG. 5B

SYSTEM FOR CARBON ABATEMENT NATURALLY OVER PAVED ENVIRONMENTS

CROSS-REFERENCE TO RELATED APPLICATIONS

This application claims priority to U.S. provisional patent application Ser. No. 62/549,778, filed Aug. 24, 2017, the disclosure of which is incorporated by reference herein in its entirety.

BACKGROUND

Embodiments of the disclosure relate to the carbon emissions, and more particularly to a system and method for naturally abating carbon emissions adjacent paved environments.

Global warming is the theory which states that there is an increase in the average temperature of the Earth's atmosphere and of the oceans due to the greenhouse effect caused by the emission of carbon dioxide and other gases. The temperature of the Earth's atmosphere has increased since the end of the $19^{th}$ century and it is estimated that this warming is largely due to human activity, which has increased during recent decades. The theory furthermore predicts that temperatures will continue to rise in the future if the emission of such greenhouse gases continues.

Under the Kyoto protocol, various countries are obligated to reduce carbon dioxide emissions and the emissions of other gases causing the so-called greenhouse effect. Carbon dioxide emissions may be limited either by reducing the amount of fossil fuel used, or by disposing of or abating the carbon dioxide that is emitted before it reaches the Earth's atmosphere.

BRIEF DESCRIPTION

According to one or more embodiments, a carbon abatement system includes at least one carbon abatement panel including a carbon abatement material. The at least one carbon abatement panel is rotatable about an axis to maximize exposure of the carbon abatement material to sunlight.

In addition to one or more of the features described above, or as an alternative, in further embodiments the at least one carbon abatement panel is mounted adjacent an area where carbon dioxide is emitted such that the carbon dioxide naturally contacts the carbon abatement material.

In addition to one or more of the features described above, or as an alternative, in further embodiments the area where carbon dioxide is emitted includes a paved environment.

In addition to one or more of the features described above, or as an alternative, in further embodiments the at least one carbon abatement panel includes a first carbon abatement panel and a second carbon abatement panel, wherein the axis of the first carbon abatement is parallel and offset from the second carbon abatement panel.

In addition to one or more of the features described above, or as an alternative, in further embodiments the at least one carbon abatement panel includes at least one carbon abatement assembly, the carbon abatement material being a part of the at least one carbon abatement assembly.

In addition to one or more of the features described above, or as an alternative, in further embodiments the carbon abatement assembly further comprises: a base including a top, bottom, and at least one sidewall that defines a cavity; a ground cover layer disposed within the cavity adjacent the bottom of the base; and a layer of soil arranged upwardly adjacent the ground cover layer, wherein the layer of soil mounts the carbon abatement material within the cavity.

In addition to one or more of the features described above, or as an alternative, in further embodiments comprising a plurality of water storing crystals for supplying water to the carbon abatement material.

In addition to one or more of the features described above, or as an alternative, in further embodiments comprising a cover removably coupled to the base, wherein the carbon abatement material receives sunlight through the cover.

In addition to one or more of the features described above, or as an alternative, in further embodiments the at least one carbon abatement assembly comprises a plurality of carbon abatement assemblies, the plurality of carbon abatement assemblies are formed as modules removable associated with the at least one carbon abatement panel.

In addition to one or more of the features described above, or as an alternative, in further embodiments the carbon abatement material is a photosynthetic organism configured to use sunlight and carbon dioxide to form sugar.

In addition to one or more of the features described above, or as an alternative, in further embodiments the carbon abatement material is a plant native to a region where the carbon abatement system is located.

In addition to one or more of the features described above, or as an alternative, in further embodiments the at least one carbon abatement panel is rotatable about the axis up to 75 degrees.

In addition to one or more of the features described above, or as an alternative, in further embodiments comprising a control system for determining a desired position of the carbon abatement panel to maximize exposure of the carbon abatement material to sunlight and for rotating the carbon abatement panel about the axis to the desired position.

In addition to one or more of the features described above, or as an alternative, in further embodiments comprising a power source including at least one solar cell configured to harvest power for rotating the carbon abatement panel about the axis.

In addition to one or more of the features described above, or as an alternative, in further embodiments the power source includes an energy storage device associated with the at least one solar cell.

According to another embodiment, a method of abating carbon dioxide includes rotating a carbon abatement panel including a carbon abatement material about an axis to maximize exposure of the carbon abatement material to sunlight, directing carbon dioxide towards the carbon abatement panel, and absorbing carbon dioxide via the carbon abatement material.

In addition to one or more of the features described above, or as an alternative, in further embodiments absorbing carbon dioxide is part of a photosynthesis performed by the carbon abatement material.

In addition to one or more of the features described above, or as an alternative, in further embodiments comprising determining a desired position of the carbon abatement panel to maximize exposure of the carbon abatement material to sunlight.

In addition to one or more of the features described above, or as an alternative, in further embodiments comprising sending a signal to a motor operably coupled to the carbon abatement panel to rotate the carbon abatement panel to the desired position.

In addition to one or more of the features described above, or as an alternative, in further embodiments determining the desired position of the carbon abatement panel further comprises sensing a position of the carbon abatement panel relative to a sun.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The following descriptions should not be considered limiting in any way. With reference to the accompanying drawings, like elements are numbered alike:

FIG. 4 is a perspective view of a carbon abatement system according to an embodiment;

FIGS. 5A and 5B are side views of the support structure associated with the carbon abatement panel according to an embodiment;

DETAILED DESCRIPTION

A detailed description of one or more embodiments of the disclosed apparatus and method are presented herein by way of exemplification and not limitation with reference to the FIGS.

Figure 1:
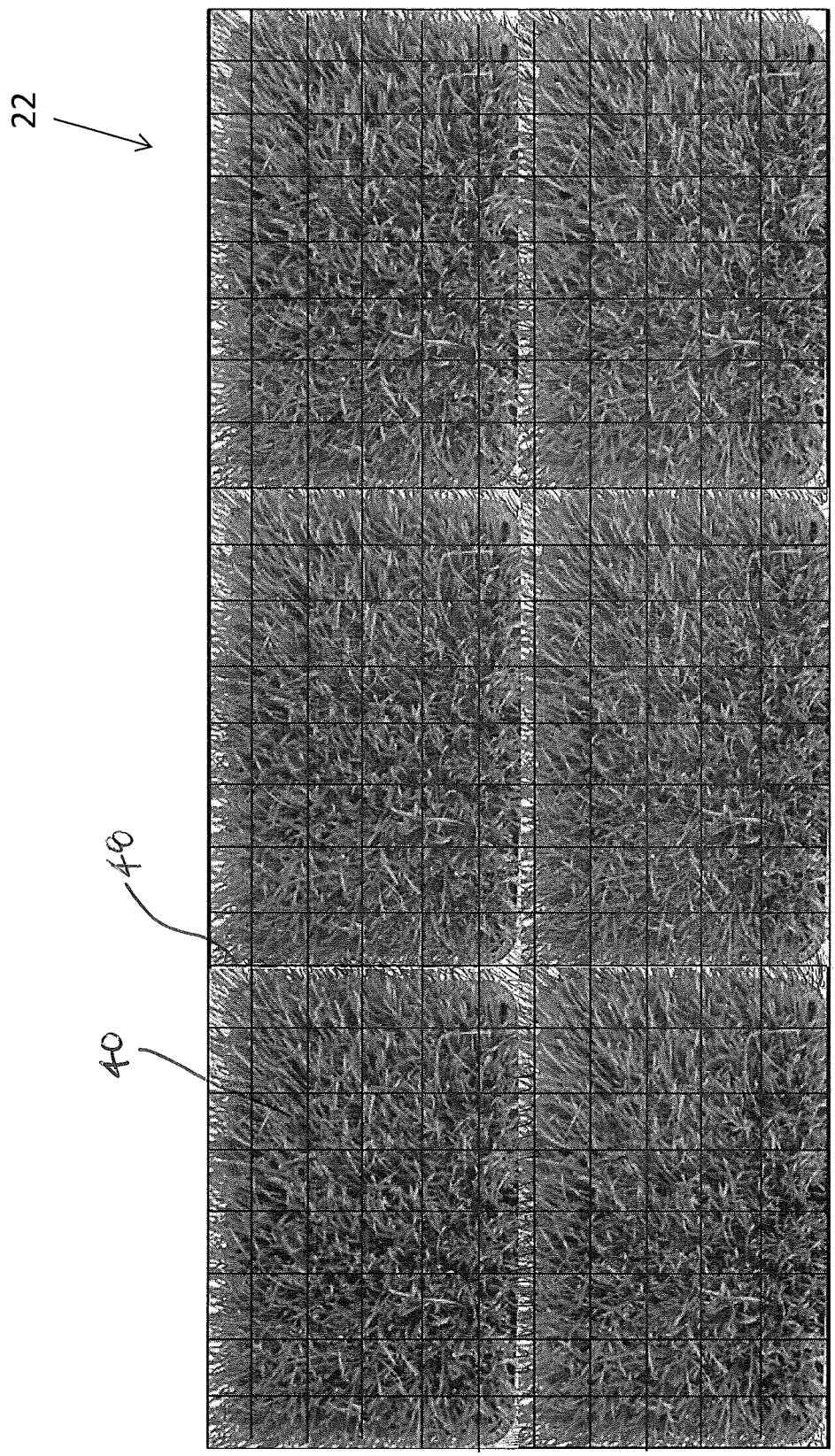
FIG. 1 is a top view of a carbon abatement panel of a carbon abatement system according to one embodiment.
Figure 2:
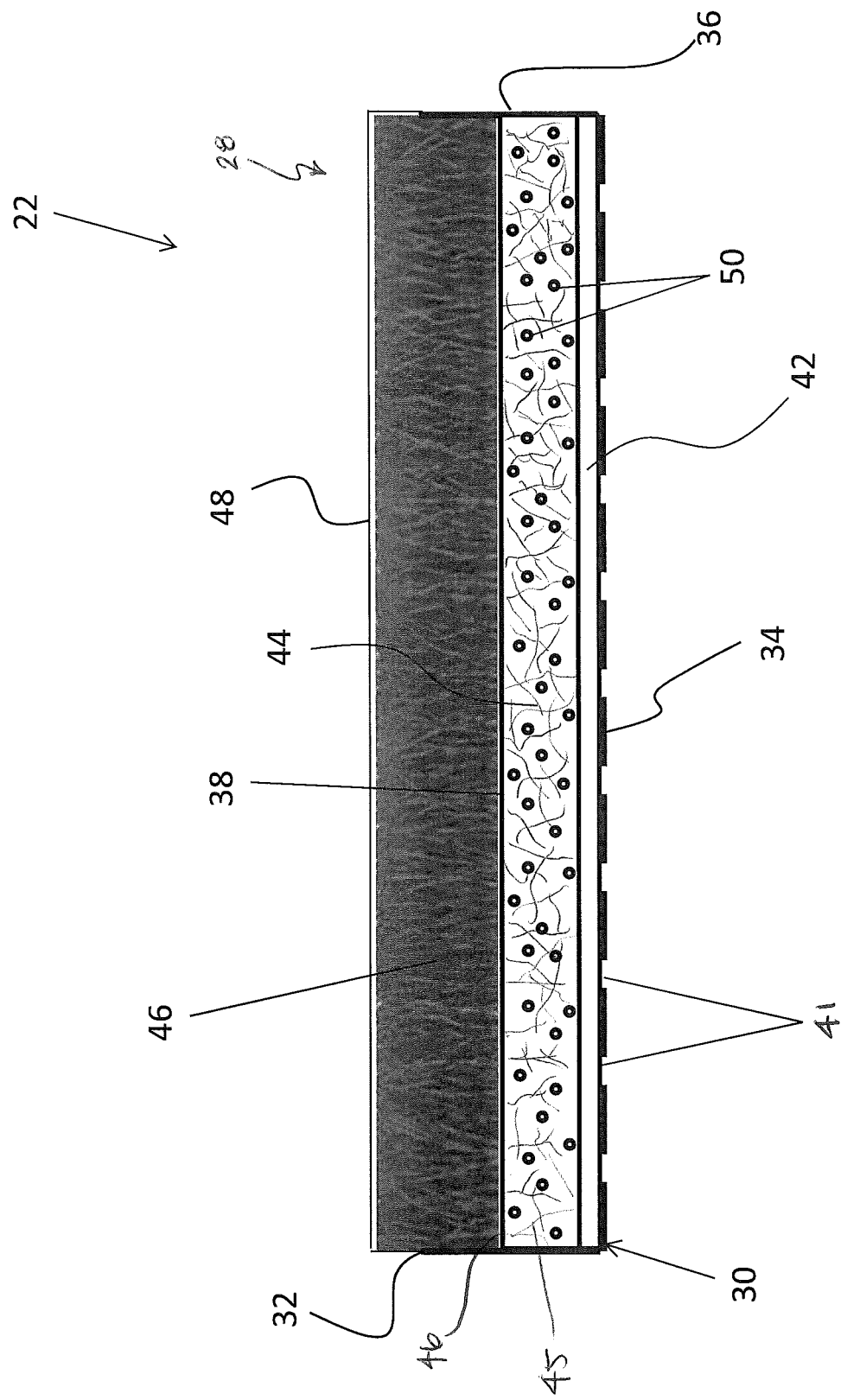
FIG. 2 is a cross-sectional view of the carbon abatement panel of FIG. 1 according to an embodiment.

With reference now to FIGS. 1 and 2, an example of a carbon abatement panel 22 for use in a carbon abatement system 20 is illustrated. Although the panel 22 is shown as being generally rectangular in shape, it should be understood that a panel 22 having any shape is contemplated herein. As best shown in FIG. 2, the carbon abatement panel 22 includes a carbon abatement assembly 28 comprising a base 30 having a top 32, a bottom 34, and one or more sidewalls 36 extending there between to define an interior cavity 38 for storing a carbon abatement material 40. The top 32 of the base 30 includes an opening for providing access to the cavity 38. The bottom 34 is generally closed to retain the contents within the cavity 38. In an embodiment, the base 30 is formed from a metal material, such as steel for example. However, any suitable material capable of withstanding damage, such as rust, erosion, or oxidation, due to prolonged exposure to the elements is contemplated herein. A plurality of small openings 41 may be formed in the bottom 34 of the base 30, to allow excess liquid, for example rain water, accumulated within the cavity 38 to drain therefrom. The openings 41, however, are sized to restrict a flow of particulate matter, for example soil, from within the cavity 38.

In the illustrated, non-limiting embodiment, the carbon abatement material 40 within the cavity 38 is a photosynthetic organism, and more specifically a plant. In such embodiments, a ground covering layer 42 is disposed within the cavity 38, in overlapping arrangement with an upper surface of the bottom 34 of the base 30. The ground covering layer 42 may be formed from any suitable material, such as mesh or felt for example, commonly used in landscaping applications. The ground covering layer 42 similarly allows liquid, but not solid particles to filter there through. Above the ground covering layer 42 is an area of tightly packed soil 44 having a plurality of plants 40 associated therewith. In an embodiment, the roots 45 of the plurality of plants 40 are embedded within the soil 44 such that the plants 40 protrude beyond an upper surface 46 of the soil 44, and in some embodiments beyond the top 32 of the base 30. In an embodiment, a cover 48, such as a grate for example, may be removably coupled to the base 30. The configuration of the cover 48 is selected such that sunlight is able to penetrate there through and reach the plurality of plants 40. The cover 48 may assist in maintaining the contents within the cavity 38 of the panel 22. In an embodiment, one or more heating elements (not shown) may be associated with or coupled to the cover. The heating elements may be selectively operable to eliminate snow or ice accumulation thereon when the panel 22 is geographically located in a region that experiences a winter climate.

Water storing particles or crystals 50, such as formed from polyacrylamide, acrylamide sodium, or another suitable chemical composition, may be mixed within the soil 44, or may be layered between the soil 44 and the ground covering 42. Examples of such crystals 50 include Miracle Gro® Water storing crystals, Soil Moist™ Granules, and Gardman Watergel Water storing crystals. Inclusion of the water storing particles 50 within the panel 22 is configured to control the amount of water supplied to the plants 46 by absorbing and releasing water as needed. The water storing particles 50 may be sufficient to eliminate the need for a separate watering system. Alternatively, or in addition, an irrigation system (not shown) for distributing water to the photosynthetic organisms 40 as necessary, may be associated with the panel 22.

The plurality of plants 40 within the panel 22 may be substantially identical, or alternatively may vary. In an embodiment, the plants 40 selected for the panel 22 are native to the growing region where the carbon abatement system 20 is located. Further, to minimize the weight and maintenance of the system 20, in an embodiment, the plants 40 may have a mature height of less than or equal to one foot beyond the upper surface 46 of the soil 44, or less than or equal to six inches beyond the upper surface of the soil 44. Although the plants 40 illustrated in the FIG. is grass, any suitable plant is considered within the scope of the disclosure. Further, it should be understood that although the carbon abatement assembly 28 is illustrated and described with respect to plants, other suitable types of photosynthetic organisms, or other mechanism capable of converting carbon dioxide into energy or a usable product that does not negatively affect the environment are also contemplated herein.

Figure 3:
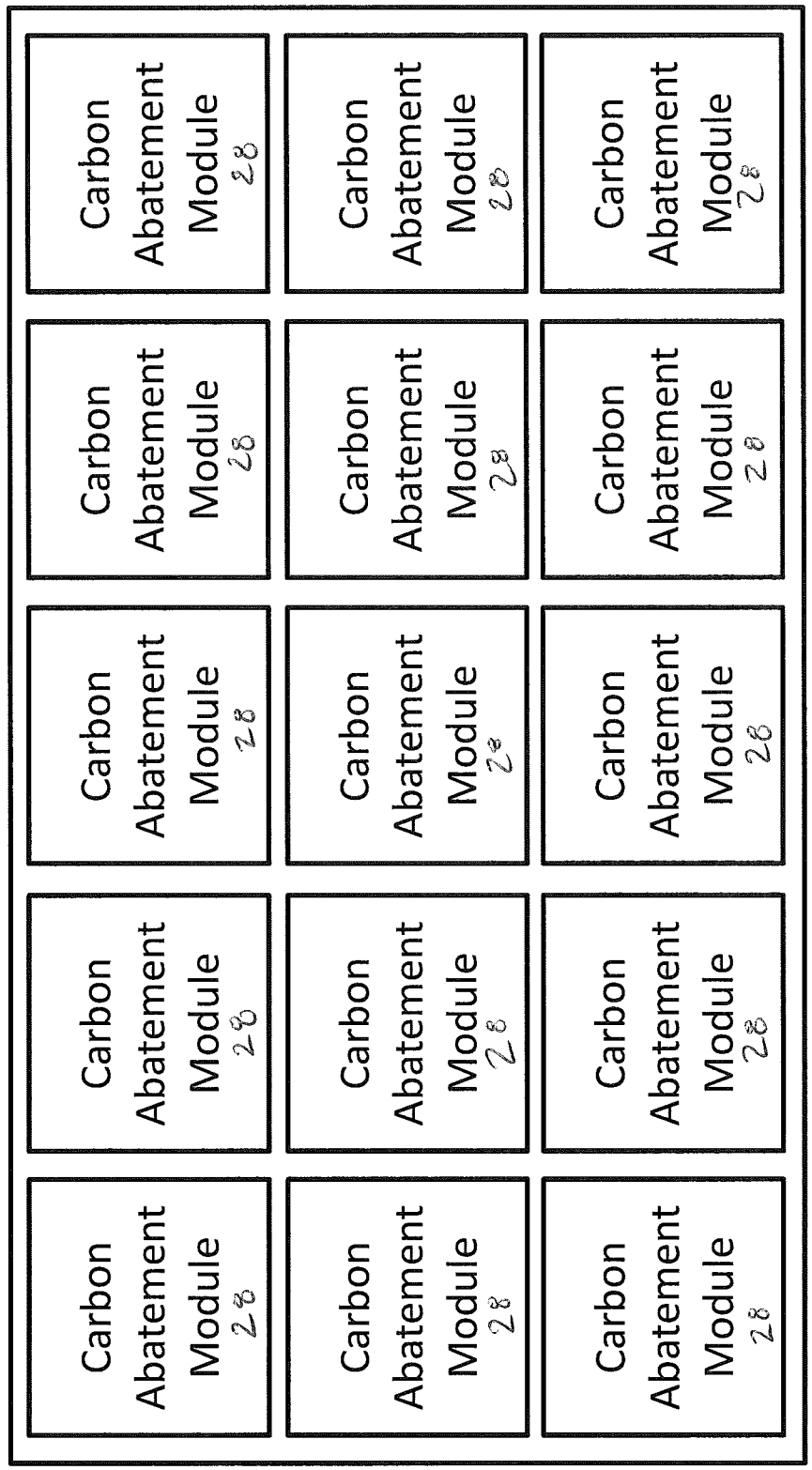
FIG. 3 is a schematic diagram of a carbon abatement panel according to another embodiment.

In the non-limiting embodiment of FIG. 2, the carbon abatement assembly 28 extends over the entire upper surface of the panel 22. However, in other embodiments, the panel 22 includes a plurality of carbon abatement assemblies 28 such that each assembly 28 extends over only a portion of the panel 22. In an embodiment, the one or more carbon abatement assemblies 28, as described above, may be formed as modules, illustrated schematically in FIG. 3, and each panel 22 may comprise a single module, or a plurality of interchangeable modules. In embodiments where the panel 22 includes a plurality of modules, adjacent sides of the modules may be coupled to one another, or alternatively, the modules may be mounted to a common support in a manner that does not inhibit drainage therefrom. Further, the plurality of modules may have a substantially identical configuration, or may vary. By forming the carbon abatement panel 22 from a plurality of carbon abatement modules, individual modules can easily be replaced, for example in the event of a failure of the carbon abatement material 40.

With reference now to FIG. 4, the carbon abatement system 20 is illustrated in more detail. As shown, the system 20 includes at least one carbon abatement panel 22 positioned adjacent an area 52, such as a paved environment, where carbon emissions typically occur. As illustrated and described herein, the area 52 generally includes a roadway 54 designated for use by vehicles 55 operated by fossil fuels, such as gasoline for example. However, it should be understood that the carbon abatement system 20 described herein may be adapted for use in any area where carbon dioxide emissions occurs, including non-paved environments and adjacent a power plant or other industrial facility for example. In the illustrated, non-limiting embodiment, the one or more panels 22 of the system 20 are disposed vertically above the roadway 54. By locating the one or more panels 22 vertically above a roadway 54, the carbon emissions generated by motor vehicles 55 travelling on the roadway 54 will naturally rise toward the one or more panels 22 or wind will move the carbon emissions into contact with the panel 22.

In embodiments where the area 52 includes a roadway 54, the carbon abatement system 20 may span the entire width of the roadway 54, as shown, or alternatively, may span only a portion thereof. For example, in embodiments where the roadway 54 is divided by a partition 56, the system 20 may extend from a first side 58 of the roadway 54 to the partition 56. Alternatively, the system 20 may span the entire roadway 54 via a first panel 22 positioned between the first side 58 of the roadway 54 and the partition 56 and a second panel 22 positioned between the partition 56 and a second, opposite side 60 of the roadway 54. It should be understood that a configuration of the system 20 having any number of panels 22 spanning any portion of a roadway 54 or other area 52 where carbon dioxide emission typically occurs is contemplated herein.

The one or more panels 22 are mounted generally adjacent the area 54 via a support structure 62, such as in a manner that does not impede passage through the area 54 by a motor vehicle 55. In an embodiment, the support structure 62 includes a first support 64 connected to a first end 66 of the at least one panel 22 and a second support 68 connected to a second opposite end 70 of the at least one panel 22. Alternatively, or in addition, the one or more panels 22 may be coupled to a support base 72 extending generally parallel to a longitudinal axis X of the panel 22 (see FIG. 5A). In such embodiments, the support base 72 may extend between the first and second supports 64, 68. In other embodiments, as shown in FIG. 5B, the support structure 62 may include a single support such that the at least one panel 22 has a cantilevered configuration. The support structure 62 illustrated and described herein is intended as an example only, and a support structure having any configuration is considered within the scope of the disclosure. Further, the support structure 62 may be used for mounting components not directly related to the carbon abatement system, such as one or more cameras for example, for monitoring traffic on the adjacent roadway 54.

To maximize the exposure of the photosynthetic carbon abatement material 40 of the one or more panels 22 to sunlight, each panel 22 is rotatable about an axis X. The panel 22 may be configured to rotate up to 75 about the axis X, or more specifically up to 60 degrees, 55 degrees, or 45 degrees for example. Accordingly, as the sun moves through the sky throughout a day, the panel 22 is configured to gradually rotate about its axis X so that the upper surface 46 of the soil, and therefore the carbon abatement material 40, generally faces towards the sun. Although the panel 22 illustrated and described herein as being rotatable about a longitudinal axis X, embodiments where the panel 22 is configured to rotate about another axis are also contemplated herein. For example, the axis of rotation may be oriented substantially perpendicular to the path of movement of the sun.

In embodiments where the system 20 includes a plurality of carbon abatement panels 22, plurality of panels 22 may be configured to rotate in unison, or may be independently rotatable. As shown in FIG. 4, the rotational axis of each of the plurality of panels 22 may be arranged in the same plane, such as in a coaxial manner for example. Alternatively, adjacent panels 22 may be offset from one another in a direction generally parallel to a travel direction defined by the roadway 54, as shown in FIG. 4. In embodiments where the rotational axes of adjacent panels 22 are arranged in parallel offset planes, the panels 22 are capable of rotating without interfering with one another. In an embodiment, the one or more panels 22 have a generally horizontal orientation when the angle of the panel is zero degrees. The at least one panel 22 may, but need not be, arranged generally parallel to the roadway 54 when at the zero degree position.

Figure 6:
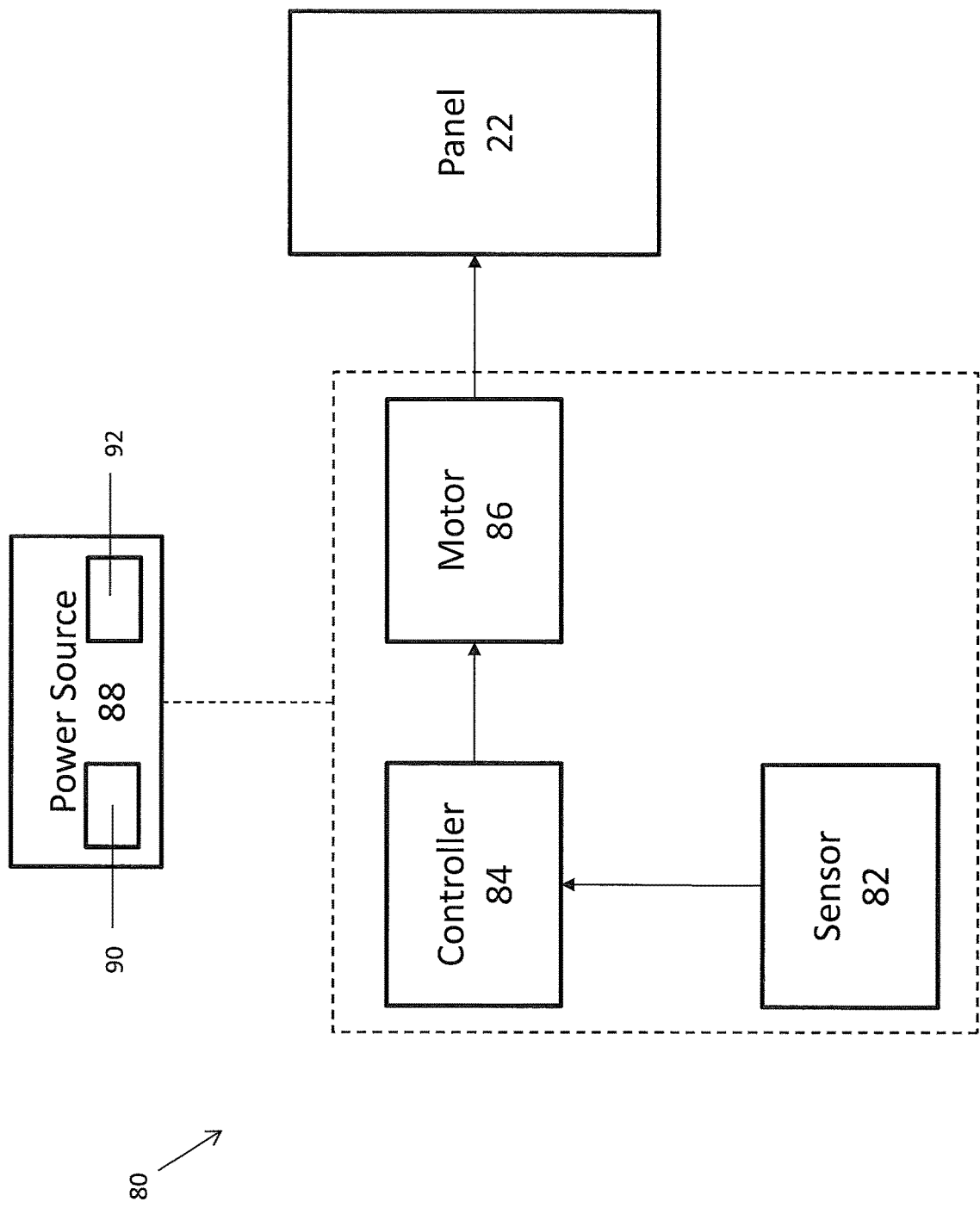
FIG. 6 is a schematic diagram of a control system of the carbon abatement system according to an embodiment.

The system 20 additionally includes a control system 80 for controlling the movement of the at least one panel 22. With reference now to FIG. 6, an example of the control system 80 is illustrated. The control system 80 includes one or more sensors, illustrated schematically at 82, such as optical or light sensors, configured to detect a position of the sun. The sensors 82 may be mounted at any position about the system 80, for example on the support structure 62 and/or the panel 22. The information from the sensors 82 is communicated to a controller 84 where the sensed information is analyzed to determine a position of the sun relative to the system 20, and to determine a desired position of the panel 22 to optimize sun exposure. The controller 84 then generates a signal for moving the panel 22 to the desired position and communicates that signal to a motor or actuator 86 operably coupled to the panel 22. Upon receipt of the signal, the motor 86 will actuate to rotate the panel 22 to the commanded position.

Figure 7:
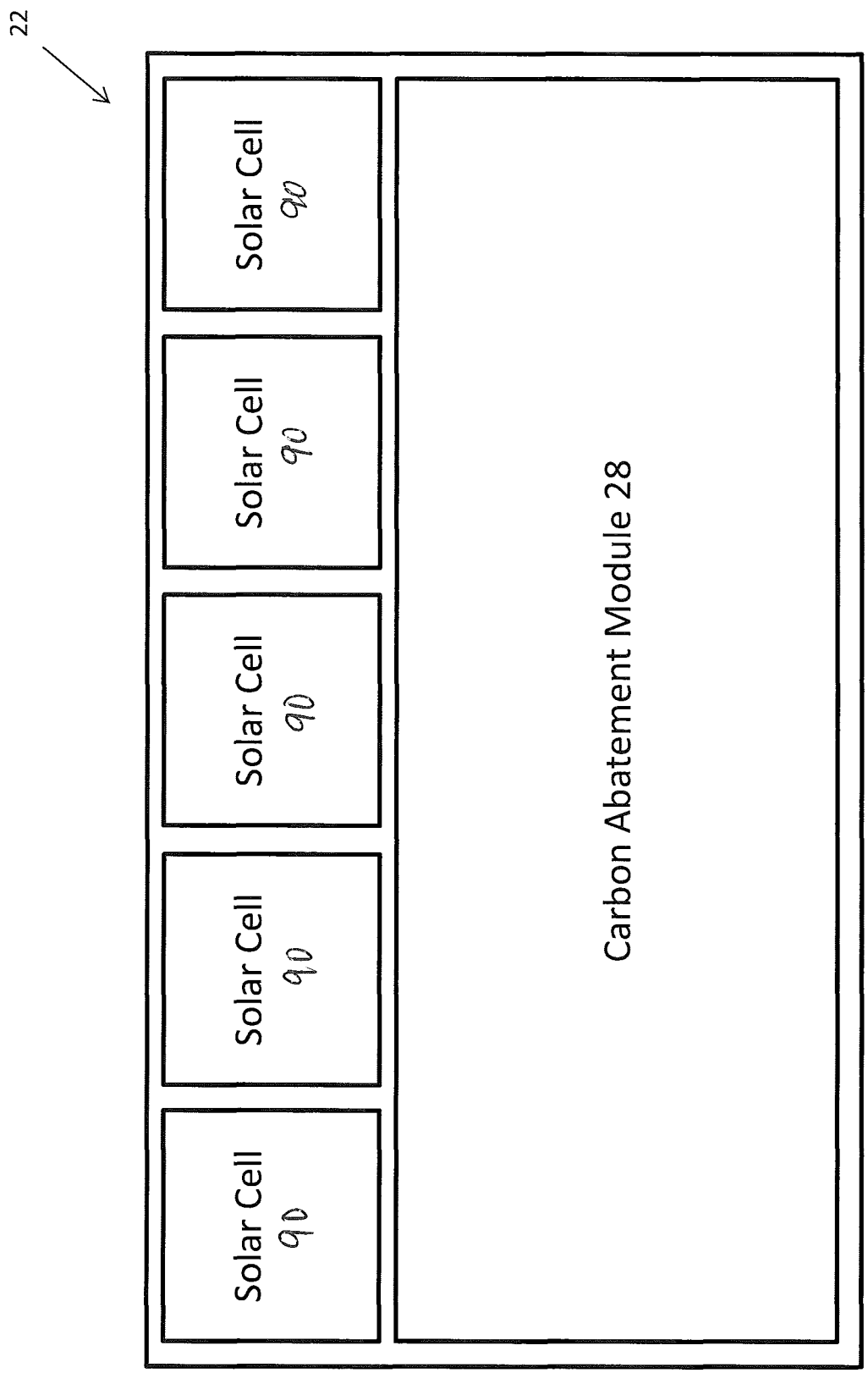
FIG. 7 is a schematic diagram of a carbon abatement panel according to another embodiment.

Power for the control system 80 may be provided from a power source, illustrated schematically at 88, within the carbon abatement system 20. The power source 88 may be configured to convert energy from the sun into usable power, such as via a solar cell 90 for example. Alternatively, or in addition, the power source 88 may include an energy storage device 92, such as a battery, for storing excess energy. The energy storage device 92 may be used to power the control system 80 when the energy generated by the solar cells 80 is less than the demands of the control system 80, such as on cloudy days for example. The one or more solar cells 90 may be integrated into the one or more carbon abatement panels 22 of the system 20, as shown in FIG. 7, or alternatively, may be grouped together to form at least one "energy generation" panel 94, distinct from the carbon abatement panel 22. Then energy generation panel 94 may be mounted by the same support structure 62 as the carbon abatement panel 22, or alternatively, by a distinct support structure, at a nearby position. In embodiments where the one or more solar cells 90 may be integrated into the one or more carbon abatement panels 22, the solar cells 90 may be formed into modules removable coupleable to the panel 22.

In embodiments where the solar cells 90 form a separate energy generation panel 62, the energy generation or charging panel 94 is similarly configured to rotate about an axis E to optimize sun exposure and is therefore offset from an adjacent panel within the system 20. Accordingly, the energy generation panel 94 is offset from an adjacent panel such that both the energy generation panel 94 and an adjacent panel, such as carbon abatement panel 22, rotate without interference. Further, the rotational axis of the energy generation panel 94 may be parallel, or alternatively, at an angle to the rotational axis X of the carbon abatement panel 22. In an embodiment, the energy generation panel 94 is configured to rotate in unison with the carbon abatement panel 22; however, embodiments where rotation of the energy generation panel 94 is independent from rotation of the carbon abatement panel 22 are also contemplated herein. Accordingly, in an embodiment, the energy generation panel 94 may rotate up to 90 degrees relative to the axis.

In operation, the carbon dioxide emitted adjacent the carbon abatement system 20 will contact the carbon abatement material 40 of the panel 22. Through a process, such as photosynthesis for example, the carbon abatement material 40 removes carbon dioxide from the environment and converts it into something usable by the material 40, such as carbohydrates or sugar (i.e. glucose) for example. In embodiments where the carbon abatement material 40 is a plant, oxygen is released as a byproduct of photosynthesis. By mounting the carbon abatement system 20 adjacent a paved environment such as roads, the carbon emissions generated by motor vehicles may be drastically abated in real time.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A carbon abatement system comprising:
   at least one carbon abatement panel including a carbon abatement material, the at least one carbon abatement panel being rotatable about an axis to maximize exposure of the carbon abatement material to sunlight, wherein the carbon abatement panel includes a carbon abatement assembly having:
   a base having a cavity;
   a ground cover layer disposed within the cavity adjacent a bottom of the base; and
   a layer of soil arranged upwardly adjacent the ground cover layer, wherein the layer of soil mounts the carbon abatement material within the cavity.

2. The carbon abatement system of claim 1, wherein the at least one carbon abatement panel is mounted adjacent an area where carbon dioxide is emitted such that the carbon dioxide naturally contacts the carbon abatement material.

3. The carbon abatement system of claim 2, wherein the area where carbon dioxide is emitted includes a paved environment.

4. The carbon abatement system of claim 1, wherein the at least one carbon abatement panel includes a first carbon abatement panel and a second carbon abatement panel, wherein the axis of the first carbon abatement is parallel and offset from the second carbon abatement panel.

5. The carbon abatement system of claim 1, wherein the at least one carbon abatement panel includes at least one carbon abatement assembly, the carbon abatement material being a part of the at least one carbon abatement assembly.

6. The carbon abatement system of claim 1, further comprising a plurality of water storing crystals for supplying water to the carbon abatement material.

7. The carbon abatement system of claim 1, further comprising a cover removably coupled to the base, wherein the carbon abatement material receives sunlight through the cover.

8. The carbon abatement system of claim 1, wherein the at least one carbon abatement assembly comprises a plurality of carbon abatement assemblies, the plurality of carbon abatement assemblies are formed as modules removable associated with the at least one carbon abatement panel.

9. The carbon abatement system of claim 1, wherein the carbon abatement material is a photosynthetic organism configured to use sunlight and carbon dioxide to form sugar.

10. The carbon abatement system of claim 8, wherein the carbon abatement material is a plant native to a region where the carbon abatement system is located.

11. The carbon abatement system of claim 1, wherein the at least one carbon abatement panel is rotatable about the axis up to 75 degrees.

12. The carbon abatement system of claim 1, further comprising a control system for determining a desired position of the carbon abatement panel to maximize exposure of the carbon abatement material to sunlight and for rotating the carbon abatement panel about the axis to the desired position.

13. The carbon abatement system of claim 1, further comprising a power source including at least one solar cell configured to harvest power for rotating the carbon abatement panel about the axis.

14. The carbon abatement system of claim 13, wherein the power source includes an energy storage device associated with the at least one solar cell.

* * * * *